(12) United States Patent
Madhok et al.

(10) Patent No.: US 8,429,113 B2
(45) Date of Patent: Apr. 23, 2013

(54) FRAMEWORK AND SYSTEM FOR IDENTIFYING PARTNERS IN NEFARIOUS ACTIVITIES

(75) Inventors: Varun Madhok, Toronto (CA); Leszek Reimus, Toronto (CA)

(73) Assignee: Infernotions Technologies Ltd., Toronto, ON (CA)

( * ) Notice: Subject to any disclaimer, the term of this patent is extended or adjusted under 35 U.S.C. 154(b) by 398 days.

(21) Appl. No.: 12/816,574

(22) Filed: Jun. 16, 2010

(65) Prior Publication Data
US 2011/0313965 A1    Dec. 22, 2011

(51) Int. Cl.
*G06F 9/44* (2006.01)
*G06N 7/02* (2006.01)
*G06N 7/06* (2006.01)

(52) U.S. Cl.
USPC ............................................................ 706/52

(58) Field of Classification Search .............. 706/52
See application file for complete search history.

(56) References Cited

U.S. PATENT DOCUMENTS

| | | | |
|---|---|---|---|
| 6,654,763 B2 | 11/2003 | Kelkar | |
| 7,050,932 B2 | 5/2006 | Selby et al. | |
| 7,143,091 B2 | 11/2006 | Charnock et al. | |
| 7,496,628 B2 * | 2/2009 | Arnold et al. | 709/206 |
| 8,135,565 B2 * | 3/2012 | Clune | 703/6 |
| 8,156,155 B1 * | 4/2012 | Yu et al. | 707/802 |
| 8,175,987 B2 * | 5/2012 | Fickie et al. | 706/13 |
| 8,195,933 B2 * | 6/2012 | Benantar | 713/156 |
| 8,233,432 B2 * | 7/2012 | Northcutt et al. | 370/328 |
| 8,250,158 B2 * | 8/2012 | Arnold et al. | 709/206 |
| 8,265,672 B1 * | 9/2012 | Osinga | 455/466 |
| 8,335,163 B2 * | 12/2012 | Li et al. | 370/248 |
| 2006/0009994 A1 | 1/2006 | Hogg et al. | |

OTHER PUBLICATIONS

S.E. Schaeffer, Graph Clustering, Computer Science Review I, Elsevier, 2007, pp. 27-64.
G.K. Palshikar and M.M. Apte, Collusion set detection using graph clustering, Data Mining and Knowledge discovery, vol. 16, 2008, pp. 135-164.
E. Staab et al, Using correlation for collusion detection, Univ of Luxembourg technical report ISBN 2-919940-72-4, 2008.

* cited by examiner

*Primary Examiner* — Michael B Holmes
(74) *Attorney, Agent, or Firm* — Scientific Works LLC; Yue Ma (57) ABSTRACT

The invention is a method and a system for discovering collusion among a network of interacting entities. Collusion is defined as a conspiracy among two or more interacting entities to use deception or an unfair advantage for private gain above their peers or other stakeholders in their network. The invention comprises a mathematical framework for measuring the collusion propensity of two or more entities in a network.

20 Claims, 7 Drawing Sheets

Ecosystem with inter-entity transactions shown as links

$P_1$: Cardinality = 2

$P_2$: Cardinality = 4

$P_3$: Cardinality = 5

$P_4$: Cardinality = 3

Figure-6

Markov random field representation of 2 dimensional interactions in the ecosystem

Figure-7

FRAMEWORK AND SYSTEM FOR IDENTIFYING PARTNERS IN NEFARIOUS ACTIVITIES

FIELD OF THE INVENTION

The present invention generally relates to collusion detection, and particularly relates to system and process for assessing collusion risks involving two or more entities in a network.

BACKGROUND OF THE INVENTION

Collusion fraud is a big problem for industries where an outcome relies on correct information to be exchanged honestly and fairly across multiple entities that are part of the operating eco-system. For instance the insurance sector reports staged accidents as an example of collusion. Staged accidents are performed by a group of individuals acting together to charge the insurer for non-existent treatment. In industry parlance, such a group is called an accident mill or a fraud ring. In one fraud scenario a vehicle is deliberately rammed into a barrier such as a wall without endangering the vehicle occupant(s). The vehicle occupant(s) claim injury and are directed to a clinic for treatment. The clinic is also part of the fraud ring. The claimants are prescribed therapy and rehabilitation equipment for non-existent soft tissue injuries. The charges for this treatment are borne by the insurance company. This type of collusion is a common insurance fraud.

In other industry segments some parties cheat their peers or their clients by restricting correct or timely information to select parties. Processes and technology exist to identify the isolated entity who subverts the process for individual gain. Barring a whistleblower, it is non-trivial to identify the other participants in the fraud. Indeed, if the singular fraudulent entity is identified but does not compromise the other participants, the remaining fraudsters remain active and learn to fly beneath the investigation unit's radar. It is thus not sufficient to assess individual service providers in isolation. In order to break fraud rings it is critical to look at the system composite and isolate subgroups who have compromised the integrity of the system. It is therefore an objective of the present invention to isolate these subgroups in a fraud ring.

It is further an objective of the present invention to assess the risk of a service provider engaging in collusion with one or more partners in the ecosystem of service providers.

It is further an objective of the present invention to detect collusion propensity in an ecosystem network.

It is further an objective of the present invention to provide a system and process for assessing the risk of collusion or detecting collusion propensities in a manner that can be scaled up such that large data volume involving hundreds of service providers and several hundreds of thousands of transactions can be handled.

It is still further an objective of the present invention to provide a system and process for assessing the risk of collusion with polynomial complexity.

SUMMARY OF THE INVENTION

Collusion is the collaboration among different service providers in a value chain for realizing gain by subverting the process. Contemporary technology and processes focus on identifying fraud at a transaction level and at the entity level. According to the present invention, a system and process looks at the ecosystem of all service providers as an aggregate and isolates suspicious patterns of aberrant transactions among specific combinations of service providers. According to one aspect of the present invention, a mathematical framework for the ecosystem comprises a representation of the entities and their interactions as a graphed network. The system parameters comprise the attributes of the individual entities, their interactions and the measures establishing the fraud propensity of every sub-graph in the network representation.

According to one aspect of the present invention, the system for assessing collusion risk comprises a data layer, an analytical layer and a reporting layer. The data layer is a structure to store and manage the transactions conducted by the ecosystem of provider entities. The analytical layer conducts the fraud propensity analysis at the singular entity's level as well as the collusion propensity analysis at the entity ensemble level. The reporting layer is a means to deliver the discoveries of the analysis in a prioritized fashion to the end user.

The data layer compiles the necessary data on the entities, the transactions, and the entity features attributes representing the ecosystem. The data elements are drafted as matrices for subsequent analysis.

In the analytical layer, an entity fraud suspicion estimator is provided for computing a fraud suspicion score for each individual entity based on the behavioral attributes of that entity and its relationships with the entities in its neighborhood. The neighborhood in this context comprises the entities that are linked directly or indirectly via transactions to the entity being assessed. The collusion risk of a group of entities is an additive metric that incorporates the fraud suspicion scores across all entities in the group. The identification of all possible groups in the ecosystem and the computation of their risks for collusion is also a function of the analytical layer.

According to one aspect of the present invention, collusion risk is measured as the cumulative suspicion scores for all entities that are linked based on their interactions in a path through the ecosystem. The path possesses a Markov property in that the suspicion score of any entity in the path is dependent only on the relationships between that entity and the entities that lie within a pre-defined neighborhood. In one embodiment of this invention, all paths between any two entities in the ecosystem are searched using a non-recursive Breadth First Search algorithm to identify all entity ensembles that are then assessed for their collusion risk.

According to yet another aspect of the present invention the collusion risk for all entities on a possible path is additive and a function of the sum of the fraud suspicion scores for all entities in the path.

According to yet another aspect of the present invention the collusion risk for each path is inversely proportional to a function of the path cardinality.

The dominant collusion risk in a network of service providers is identified by rank ordering the collusion risk scores computed across all paths identified in the system.

The present invention is advantageous over previous systems in that the collusion propensities can not only be detected at individual entity level, but also detected at entity ensemble level to isolate suspected fraud rings.

Further, the advantage of the present invention includes a computational complexity that is no worse than a polynomial on p, where p is the total number of service providers in the ecosystem. This allows for easy scale up of the system to handle large volume of data involving hundreds or thousands of service providers. The worst case implementation is when every one of the service providers has a transactional relationship with every other service provider, an unlikely scenario. Even the worst case implementation is polynomial complexity and tractable as per Cobham in "The intrinsic computational difficulty of functions", Proc. Logic, Methodology, and Philosophy of Science II (1965), North Holland. Hence this solution is amenable to practical implementation with contemporary technology.

For a more thorough understanding of the invention, its objectives and advantages refer to the following specification and to the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

In the present invention we refer to all participants in an observed ecosystem as "entities" or as "service providers". The measurable attributes for each of the service providers will be referred to as "attributes" and the interplay among the entities will be referred to as "transactions". The measurable outcome of the transactions achieved by the entities will be referred to as "outcomes". The fundamental principle of collusion detection is to ascertain if the outcome realized by a group of entities with shared transactions is not commensurate with the attributes of these entities, especially in respect to the outcome realized by a group of entities having a similar attributes profile. The propensity to commit fraud will be estimated at the individual entity level ("fraud suspicion score") and at the level of every combination of entities in the ecosystem ("collusion risk").

The invention requires a metric to measure collusion risk for an ensemble or a group of entities contained within the ecosystem. The metric possesses one or more of the following characteristics:

Collusion risk is a function of the sum of the fraud suspicion scores for every entity in the ensemble;

Fraud suspicion score for every entity in the ensemble depends on the attributes of the entity and the transactions of the entity with its neighbours;

Every entity in the ecosystem possesses the Markov property in that its suspicion score is affected only by its neighborhood;

The neighborhood of an entity is defined as the entities that are linked (directly or indirectly) to the entity under analysis;

Collusion risk is proportional to the compactness of the ensemble, i.e. a group of entities whose interactions are limited to that group will be more suspicious than a group of entities who have fewer interactions within the group than outside.

The framework for the collusion scoring is described below. The ecosystem is a network of p interacting entities represented as vertices $$V = [V_1, V_2, V_3, \ldots, V_p]$$

Each entity $V_i$ is measured on m attributes. The feature set of attributes is represented as $$F = \begin{bmatrix} f_{1,1} & \cdots & f_{1,j} & \cdots & f_{1,p} \\ \vdots & \ddots & \vdots & & \vdots \\ f_{i,1} & \cdots & f_{i,j} & \cdots & f_{i,p} \\ \vdots & & \vdots & \ddots & \vdots \\ f_{m,1} & \cdots & f_{m,j} & \cdots & f_{m,p} \end{bmatrix}$$

As an illustration, consider the scenario where all service providers are dentists and the audit being performed is on the claims they have submitted to an insurer in a given month. F can comprise one or more of the following:

Average number of procedures performed in a day
Average number of crown replacements performed in a day
Average number of root canal surgeries performed in a day
Number of non-emergency procedures performed on a statutory holiday
Average number of teeth on which surgery was performed per patient
Average number of crown replacements per patient
Average number of root canal surgeries per patient
Average volume of pain killers prescribed
Average number of X-rays per patient
Average number of root canal surgeries performed on virgin teeth (no prior cavities)

Note that the above is an exemplar list. It is not intended to be a comprehensive and exhaust list. The exclusion of other feature attributes does not indicate that those attributes are not useful for the purpose of fraud detection.

The transaction matrix representing the interactions among the p entities are $$T = \begin{bmatrix} t_{1,1} & \cdots & t_{1,j} & \cdots & t_{1,p} \\ \vdots & \ddots & \vdots & & \vdots \\ t_{i,1} & \cdots & t_{i,j} & \cdots & t_{i,p} \\ \vdots & & \vdots & \ddots & \vdots \\ t_{p,1} & \cdots & t_{p,j} & \cdots & t_{p,p} \end{bmatrix},$$

where $t_{i,j}$ is a measure of the interactions between entities $V_i$ and $V_j$. It follows that $t_{i,j}=0$ if i=j or if $V_i$ and $V_j$ do not have any interaction. Using the transaction matrix T it is possible to ascertain if there exists a relationship between any two entities. The $t_{i,j}$ measurements can be of the monetary amount transferred or it can be the number of transactions between $V_i$ and $V_j$.

In one embodiment of the invention, the ecosystem is represented by a graph, in which nodes are referred to as vertices V and edges are referred to as transaction edges defined using T.

According to one aspect of the present invention, ensembles are represented as one dimensional lattice frameworks. This lattice framework is a Markov model where each entity in the path links to at most two neighbors with whom the entity has a direct transaction-based relationship.

According to another aspect of the present invention, the neighborhood can be extended to entities that are linked indirectly to the entity under analysis.

Figure 6:
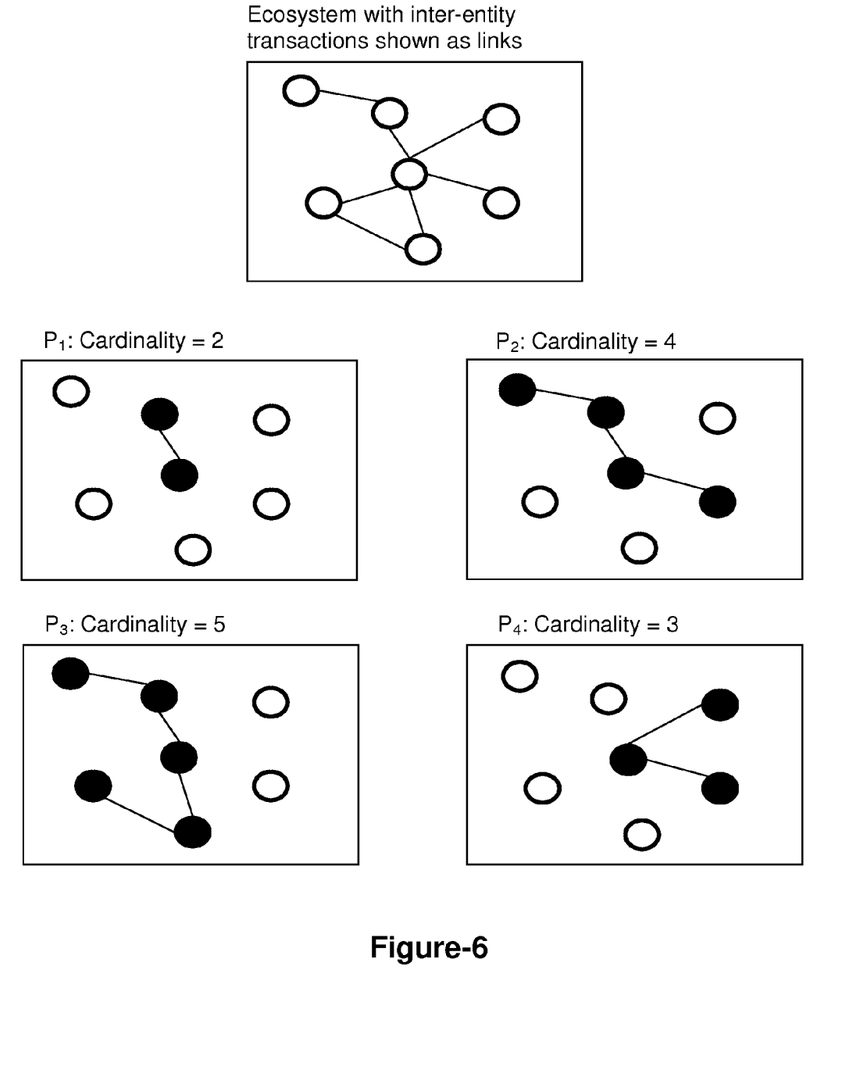
FIG. 6 contains examples of how one dimensional lattice frameworks are used to map the relationships in an ecosystem.

In the one-dimensional lattice framework all the paths in the service provider network can be found using a non-recursive variant of the Breadth First Search algorithm to traverse the graph. The non-recursive feature is preferable for deployment of the algorithm in an environment where data are maintained in a relational database. See FIG. 6 for illustrative one-dimensional paths in the ecosystem. We define $P_{i,j}$ as the series of adjacent vertices forming a unique, non-intersecting path between $V_i$ and $V_j$. $P_{i,j}(x)$ is correspondingly a vertex on this path as identified by the index x. Furthermore, the number of vertices in the path is the path cardinality and is represented as $C_{i,j}$.

In one embodiment of the invention, the collusion risk metric for the framework is $$D(P_{i,j}) = K(P_{i,j}) \Sigma_{x=1}^{C_{i,j}} d(P_{i,j}(x))$$

where d(.) is a function of T and F. d(.) is a measure of the entity fraud suspicion score for an entity based on the entity's attributes and on its relationships with the entities in its neighborhood; K(.) is a compactness criterion that weights the collusion risk metric in favor of less-dispersed ensembles.

In one embodiment of the present invention, the following compactness criterion is used with the framework representation of the ecosystem.

$$K(P_{i,j}) = \frac{1}{C_{i,j}} \exp(-\lambda C_{i,j})$$

Note also that $\lambda$ is a cluster weight parameter in the above embodiment that takes non-negative values. A large value for $\lambda$ downplays the collusion risk of large sub-networks in the ecosystem. In contrast, for $\lambda=0$ the collusion risk is the straight average of the fraud risks over all adjacent vertices in the path.

According to one aspect of the invention, the ecosystem is a one-dimensional Markov model lattice framework representation, such that the fraud suspicion for an entity $V_i$ is dependent only on its two immediate neighbors: $V_{i-1}$ and $V_{i+1}$. If the number of transactions handled by the entities in V is given as $$N = [N_1, \ldots, N_p]$$

and the respective fraud propensities are a measure of aberrations of the individual entities from the norm, defined as $$S = [S_1, \ldots, S_p].$$

The entity fraud suspicion score for $V_i$ is measured as $$d(V_i) = \frac{1}{2} \left( \frac{N_{i-1} S_i + N_i S_{i-1}}{N_{i-1} + N_i} + \frac{N_{i+1} S_i + N_i S_{i+1}}{N_i + N_{i+1}} \right)$$

Figure 7:
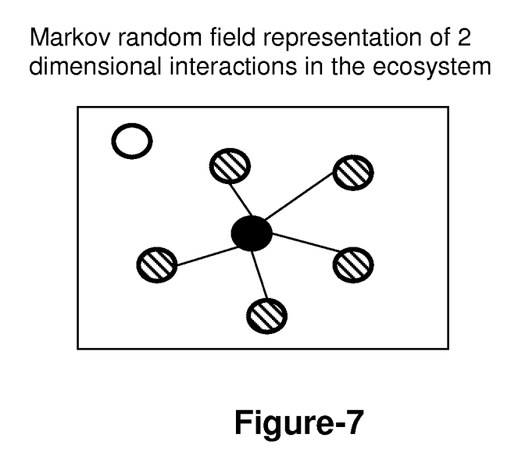
FIG. 7 is a two-dimensional Markov Random Field representation of nearest neighbor interactions in the ecosystem according to one aspect of the present invention.

In another embodiment of the invention, the ecosystem is represented in two dimensions as a Markov random field, as in the Ising model. FIG. 7 is a representation of neighborhood interactions in more than one dimension as used in the computation of the entity fraud suspicion score. Note that the Markov chain representation restricts interactions to a single dimension and is thus a restriction of the Markov Random Field implementation.

By way of example, a variation to the entity fraud suspicion score metric for the two dimensional nearest neighbor interactions observed for a Markov Random Field requires measurements of the interactions between the entity in observation with each of its neighbors. If entity $V_0$ has fraud propensity score $S_0$, m neighbors $[V_1, \ldots, V_m]$, each of which records $[N_1, \ldots, N_m]$ transactions respectively and has suspicion propensities calculated as $[S_1, \ldots, S_m]$; where the interactions between entities $V_0$ and $V_i$ are listed as $N_{0,i}$ for $i = 1, \ldots, m$, then $$d(V_0) = \frac{S_0 + \sum_{i=1}^{m} \alpha_i S_i}{1 + \sum_{i=1}^{m} \alpha_i}$$

using the weight parameters $$\alpha_i = \frac{N_{0,i}}{N_i}.$$

In another embodiment of the present invention, the neighborhood of influence for an entity extends beyond the nearest neighbor to entities that are linked indirectly to the entity under analysis. The entity fraud suspicion score can be extended to incorporate the risk associated with the next to the nearest neighbors of the entity under analysis.

By way of example where $V_0$ has fraud propensity score $S_0$; m directly linked neighbors $[V_1, \ldots, V_m]$, each of which records $[N_1, \ldots, N_m]$ transactions respectively and has fraud propensities calculated as $[S_1, \ldots, S_m]$; q indirectly linked neighbors $[\tilde{V}_1, \ldots, \tilde{V}_q]$, each of which records $[\tilde{N}_1, \ldots, \tilde{N}_q]$ transactions respectively and has suspicion propensities (measurements of aberration) calculated as $[\tilde{S}_1, \ldots, \tilde{S}_q]$; where the interactions between $V_0$ and $V_i$ are listed as $N_{0,i}$ for $i = 1, \ldots, q$, $$\text{then } d(V_0) = \frac{S_0 + \sum_{i=1}^{m} \alpha_i S_i + \sum_{j=1}^{q} \beta_j \tilde{S}_j}{1 + \sum_{i=1}^{m} \alpha_i + \sum_{j=1}^{q} \beta_j}$$

where $\{\beta_j\}$ are weight parameters with values from the interval [0, 1], and are based on the indirect interactions between the listed neighbours and the entity under analysis.

According to one aspect of the present invention, fraud typical of crooked dentists can be categorized as unbundling, unnecessary procedures and fake claim submissions. For example, unbundling is the practice where a specific procedure on a tooth is billed separately for the constituent subprocedures (such as anesthesia and sutures). It is also a common fraud for dentists to recommend x-rays or complex procedures when none are needed. A dentist's fraud propensity may be estimated as a measure of aberration and the variance in his/her feature attribute profile from the ensemble average on features measured over his/her peers. The fraud propensity for every dentist in the entity set V is a function of F and T represented as $$S = [S_1, S_2, S_3, \ldots, S_p].$$

S is used as an argument for the entity suspicion fraud score metric d(.)

According to one aspect of the present invention, the function for the fraud propensity assignment is based on standard industry techniques. For example, in U.S. Pat. No. 7,050,932 to Selby and Thomas, a predictive model is used to identify outliers. In another embodiment of the present invention, look-alike models built using past knowledge of fraud incidents are used to score the entities on current data observations. The output of this step is used as input to d(.).

Figure 1:
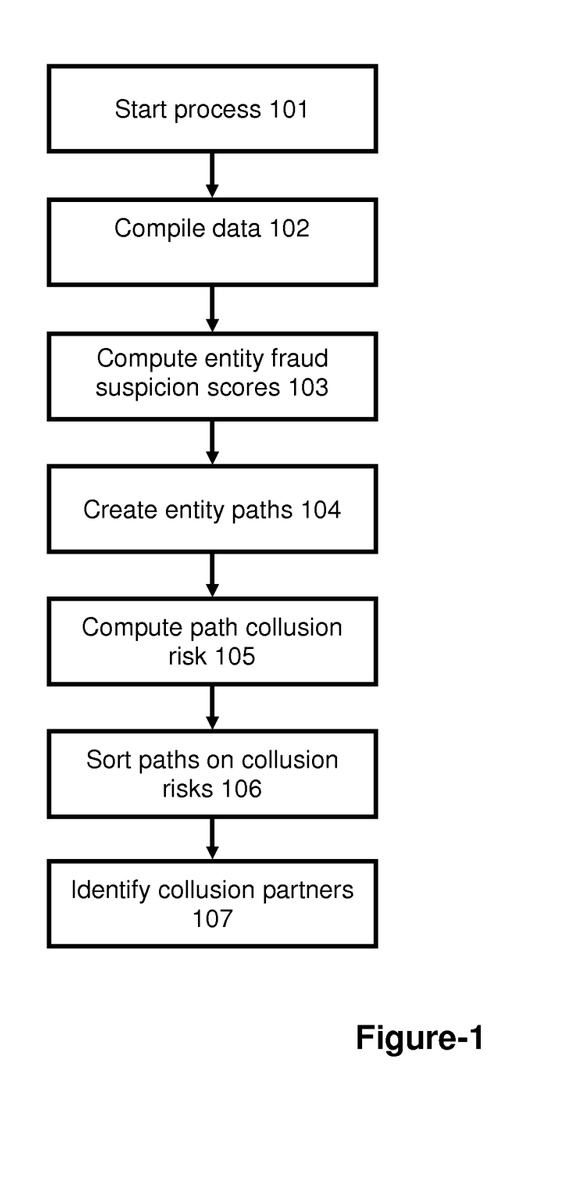
FIG. 1 is an exemplary process flow for creating and implementing the mathematical framework for collusion detection in accordance with the present invention.

In reference to FIG. 1, a process flow for using the above framework for collusion detection is shown. In data compilation (102) the matrices representing the entities (V), the transactions (T), and the entity feature attributes (F) are drafted. In entity fraud score computation (103) $d(V_i)$ are computed for each entity $V_i$ in V. This entails the definition of the neighborhood of an entity.

Depending on the ecosystem representation, as a Markov Random Field in one or in two dimensions, an algorithm such as the Breadth First Search algorithm is used to identify all possible paths within the ecosystem (104).

Next the metric for collusion risk measurement is designed. This is a function of the paths used to map interacting entities in the ecosystem. The collusion risk is measured (105) for each of the paths identified earlier (104).

In collusion risk assessment (106), the path collusion risk scores are sorted in descending order to identify the group of entities with the most suspicious behavior indicative of collusion fraud. The entities with highest risks for collusion fraud are listed (107) for follow-on investigation.

Figure 2:
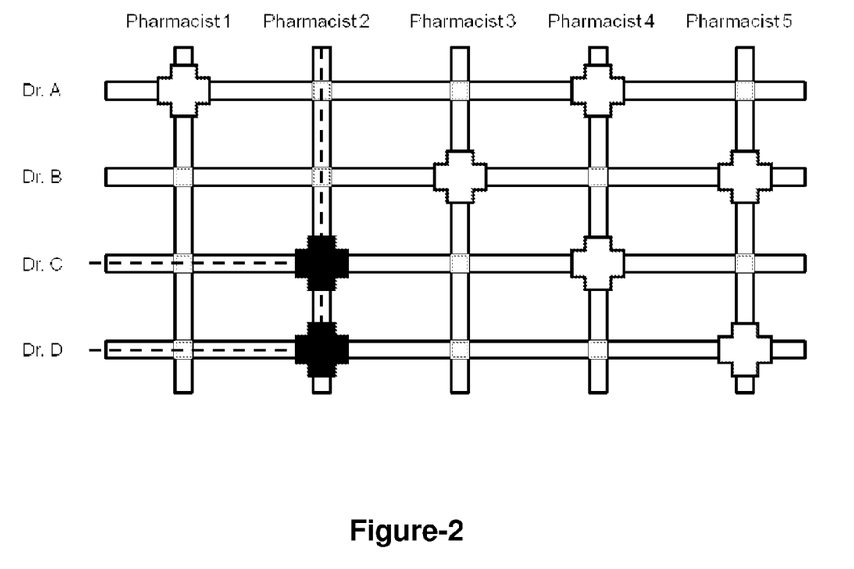
FIG. 2 is an exemplary representation of the principle of collusion detection in accordance with the present invention.

In reference to FIG. 2, an exemplary simplified representation of an ecosystem of service providers for an insurer is shown. The grid shown in FIG. 2 represents the linkages among the Pharmacists and the doctors. The knots represent the transactions in common between a doctor and a pharmacist. For example, Dr. B filled prescriptions that were handled either by Pharmacist 3 or by Pharmacist 5. All claimants to the insurer whose treatment is covered under their insurance plans go to one of the medical practitioners identified as Drs. A, B, C or D. The claimants are then prescribed medication and directed to pharmacies. The pharmacies then supply the claimant with the medication. The invoices for the consultations and the medical prescriptions are then sent over to the insurer for payments. A typical abuse of the system is when doctors supplement their income by selling prescriptions that are filled and then resold on the black market. AIDS medications, Oxycontin, Vicodin are popular choices for prescription fraud. In most cases this kind of fraud requires forgeries or theft of prescription pads. When there is active participation from the doctor, the claimant and the pharmacist, detecting this fraud is very difficult. The invention iteratively identifies all the paths in the network with linked service providers and rank orders these on their collusion risk. In reference to FIG. 2 the output of the algorithm identifies the paths with highest collusion risks. The top three paths are {Dr. C, Pharmacist 2}, {Dr. C, Pharmacist 2, Dr. D}, {Dr. D, Pharmacist 2} and these are highlighted in FIG. 2.

Figure 3:
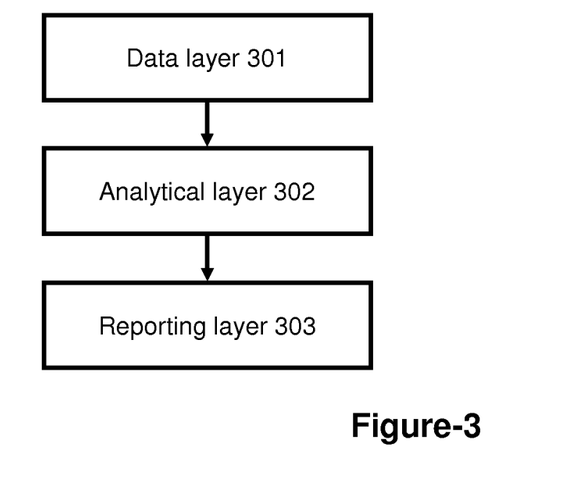
FIG. 3 is an exemplary modular representation of the delivery system in accordance with the present invention.

In reference to FIG. 3 a modular representation of a system that detects collusion fraud is shown. There are three layers to the system: data layer for storing and managing the data representing the network ecosystem (301); analytical layer for generating the various entity and path fraud score estimates (302); and reporting layer for delivering the results to the end-user (303).

Figure 4:
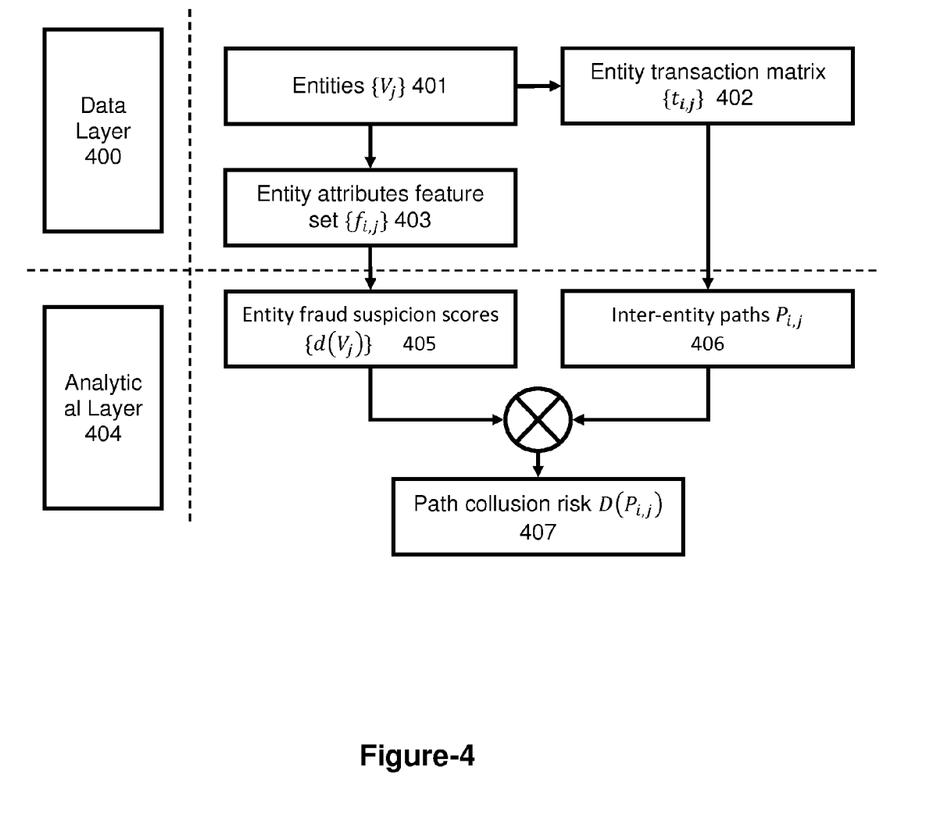
FIG. 4 is an exemplary mapping of the mathematical framework for collusion detection to the system modules in accordance with the present invention.

In reference to FIG. 4, an exemplary mapping of the mathematical framework to the collusion identification system is shown. In the data layer (400), data on entities (401), the inter-entity transactions (402) and entity features (403) are captured. In the analytical layer (404), the computation of the entity fraud suspicion scores (405), the path finding among all entities in the ecosystem (406) and the path collusion risk scores (407) for each of the entities and the paths are estimated.

Figure 5:
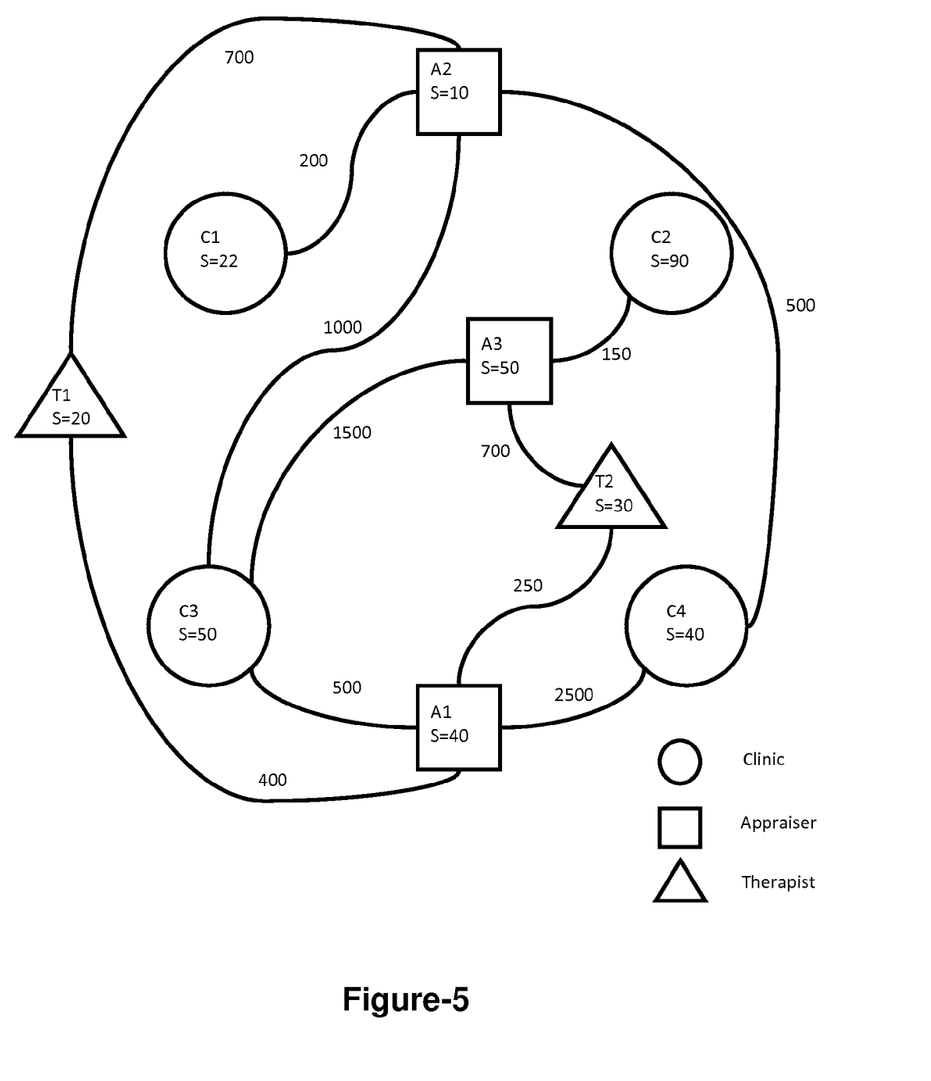
FIG. 5 is a mock representation of a service provider ecosystem comprising four medical clinics, three appraisers and two therapists in accordance with the present invention.

In reference to FIG. 5 an exemplary ecosystem of service providers comprising four clinics, three appraisers and two therapists, are shown to demonstrate the application of this invention. Each of the service provider entities has been scored individually on a suspicion scale of 1 to 100 based on their transactional attributes. These scores are a measure of the entities' aberration from the norm and correspond to the fraud propensity matrix S as defined earlier. The respective fraud propensity indices are shown in the figure. For example, the appraiser $A_1$ has a fraud propensity index S=40. The ecosystem represents the scenario where the patients' treatment plans submitted by the clinics to appraisers, who subsequently direct the patients to specific therapists for follow-on work.

The path collusion risk is calculated using compactness criterion as $$D(P_{i,j}) = \frac{1}{C_{i,j}} \exp(-\lambda_0 C_{i,j}) \sum_{x=1}^{C_{i,j}} d(P_{i,j}(x))$$

where $\lambda_0$ is preferably set to 0.3 according to one aspect of the present invention. According to one aspect of the invention, the ecosystem network is a one-dimensional Markov model, in which the entity fraud suspicion score is calculated as:

$$d(V_i) = \frac{1}{2}\left(\frac{N_{i-1}S_i + N_i S_{i-1}}{N_{i-1} + N_i} + \frac{N_{i+1}S_i + N_i S_{i+1}}{N_i + N_{i+1}}\right)$$

where $N_i$ is the number of transactions handled by a service provider, and $N_i$ can be calculated from T the transaction matrix, that is read from FIG. 5 as $$T = \begin{bmatrix} 0 & 0 & 0 & 0 & 0 & 200 & 0 & 0 & 0 \\ 0 & 0 & 0 & 0 & 0 & 0 & 150 & 0 & 0 \\ 0 & 0 & 0 & 0 & 500 & 1000 & 1500 & 0 & 0 \\ 0 & 0 & 0 & 0 & 2500 & 500 & 0 & 0 & 0 \\ 0 & 0 & 500 & 2500 & 0 & 0 & 0 & 400 & 250 \\ 200 & 0 & 1000 & 500 & 0 & 0 & 0 & 700 & 0 \\ 0 & 150 & 1500 & 0 & 0 & 0 & 0 & 0 & 700 \\ 0 & 0 & 0 & 0 & 400 & 700 & 0 & 0 & 0 \\ 0 & 0 & 0 & 0 & 250 & 0 & 700 & 0 & 0 \end{bmatrix};$$

and $S_i$ is read from FIG. 5 as $$S = [22, 90, 50, 40, 40, 10, 50, 20, 30];$$

and the ecosystem as shown in FIG. 5 is represented as $$V = [C_1, C_2, C_3, C_4, A_1, A_2, A_3, T_1, T_2].$$

The table below lists the paths and the entity combinations with the five highest collusion risks for the system described in FIG. 5.

| Start vertex $V_j$ | End vertex $V_j$ | Path between start and end vertices | Collusion risk for chosen path |
|---|---|---|---|
| $C_2$ | $A_3$ | $C_2 - A_3$ | 87.6 |
| $C_3$ | $A_3$ | $C_3 - A_3$ | 50.0 |
| $C_2$ | $C_3$ | $C_2 - A_3 - C_3$ | 47.62 |
| $C_3$ | $A_1$ | $C_3 - A_1$ | 45.48 |
| $C_2$ | $T_2$ | $C_2 - A_3 - T_2$ | 42.69 |

The entity pair with the highest propensity for collusion fraud is $A_3$, $C_2$. Broadening the scope of the investigation, the group of three with the highest propensity for collusion fraud are the service providers $A_3$, $C_2$, $C_3$.

The description of the invention can be implemented using a general purpose computer with storage medium for storing computer instructions implementing the mathematical framework, memory for executing computer instructions and data I/O peripherals for reading data and delivering results to the end-user. The I/O peripherals may include serial port, parallel port, USB, Bluetooth, Wi-Fi, Ethernet, or other wired or wireless interfaces. The I/O peripherals may also include keyboards, display other user input and output devices.

Furthermore, large insurers typically handle several hundred thousand claim transactions across several hundred medical practitioners and pharmacies. The collusion propensity scoring needs an algorithm and a structure that lends itself to large volume data analysis. The mathematical framework presented here is a polynomial complexity algorithm suitable for the large data volume implementation.

The description of the invention is merely exemplary in nature and, thus, variations of the above disclosed embodiments can also be made to accomplish the same functions, for example through the use of Markov random field representations of the ecosystem and through extending the definition of neighborhood to include entities that are linked indirectly to each other.

Still further variations, including combinations and/or alternative implementations, of the embodiments described herein can be readily obtained by one skilled in the art, without burdensome and/or undue experimentation. Such variations are not to be regarded as a departure from the spirit and scope of the invention.

What is claimed is:

1. A method using a computer to identify collusion partners for use in assessing collusion risks involving two or more entities in an ecosystem network, wherein said ecosystem network having a plurality of entities, entity feature attributes, and transactions between entities, said method comprising the steps of:
   calculating an entity suspicion score for each of said plurality of entities based on each entity's feature attributes and on its relationships with other entities in its neighborhood in said ecosystem network;
   finding all possible entity pairs from said plurality of entities, therein each pair having a first entity and a second entity;
   searching all non-intersecting paths between said first entity and said second entity of each found pair of entities;
   calculating a collusion risk score for each of said non-intersecting paths;
   sorting collusion risk scores of all non-intersecting paths for said all possible entity pairs; and
   identifying collusion partners from entity pairs having top collusion risk scores.

2. The method of claim 1, wherein said plurality of entities in said ecosystem network comprising of clinics, appraisers and therapists.

3. The method of claim 1, wherein said plurality of entities in said ecosystem network comprising of doctors and pharmacists.

4. The method of claim 1, wherein said step of searching non-intersecting path uses BFS method.

5. The method of claim 1, wherein said collusion risk score is directly proportional to the sum of entity suspicion scores of every entity in said each path and to a compactness criterion of said each path, therein $$D(P_{i,j}) = K(P_{i,j}) \Sigma_{x=1}^{C_{i,j}} d(P_{i,j}(x))$$

where $P_{i,j}$ is a non-intersecting path between entities $V_i$ and $V_j$, $P_{i,j}(x)$ is an entity on the path $P_{i,j}$ identified by index $x$, $C_{i,j}$ is the cardinality of path $P_{i,j}$, $d(.)$ is the entity fraud suspicion score, and $K(.)$ is a compactness criterion that weights said collusion risk score in favor of less-dispersed ensembles.

6. The method of claim 5, wherein said compactness criterion is based on the following:

$$K(P_{i,j}) = \frac{1}{C_{i,j}} \exp(-\lambda C_{i,j})$$

where $\lambda$ is a cluster weight parameter having non-negative values.

7. The method of claim 5, wherein said ecosystem network is modeled as having a Markov property.

8. The method of claim 7, wherein said ecosystem network is a one-dimensional lattice network with neighborhood restricted to entities with direct interactions, and wherein said step of calculating entity fraud suspicion score is based on the following:

$$d(V_i) = \frac{1}{2} \left( \frac{N_{i-1} S_i + N_i S_{i-1}}{N_{i-1} + N_i} + \frac{N_{i+1} S_i + N_i S_{i+1}}{N_i + N_{i+1}} \right)$$

where $N_i$ is the number of transactions handled by entity $V_i$ and $S_i$ is a fraud propensity score for entity $V_i$.

9. The method of claim 7, wherein said ecosystem network is two-dimensional with neighborhood restricted to entities with direct interactions, and said step of calculating entity fraud suspicion score is based on the following:

$$d(V_0) = \frac{S_0 + \sum_{i=1}^{m} \alpha_i S_i}{1 + \sum_{i=1}^{m} \alpha_i}$$

wherein entity $V_0$ has fraud propensity score $S_0$; m directly linked neighbors $[V_1, \ldots, V_m]$, each of which records $[N_1, \ldots, N_m]$ transactions respectively and has fraud propensities calculated as $[S_1, \ldots, S_m]$; the interactions between $V_0$ and $V_i$ are listed as $N_{0,i}$ for $i=1, \ldots, m$; and the weight parameters $$\alpha_i = \frac{N_{0,i}}{N_i}.$$

10. The method of claim 7, wherein said ecosystem network is two-dimensional with neighborhood extended to entities with indirect interactions and said step of calculating entity fraud suspicion score is based on the following:

$$d(V_0) = \frac{S_0 + \sum_{i=1}^{m} \alpha_i S_i + \sum_{j=1}^{q} \beta_i \tilde{S}_j}{1 + \sum_{i=1}^{m} \alpha_i + \sum_{j=1}^{q} \beta_j}$$

where $V_0$ has fraud propensity score $S_0$; m directly linked neighbors $[V_1, \ldots, V_m]$, each of which records $[N_1, \ldots, N_m]$ transactions respectively and has fraud propensities calculated as $[S_1, \ldots, S_m]$; q indirectly linked neighbors $[\tilde{V}_1, \ldots, \tilde{V}_q]$, each of which records $[\tilde{N}_1, \ldots, \tilde{N}_q]$ transactions respectively and has fraud propensities calculated as $[\tilde{S}_1, \ldots, \tilde{S}_q]$; the interactions between $V_0$ and $V_i$ are listed as $N_{0,i}$ for $i=1, \ldots, q$; and $\{\beta_j\}$ are weight parameters with values from the interval $[0,1]$.

11. A system of group collusion risk assessment for use in assessing collusion risks involving two or more entities in an ecosystem network, wherein said ecosystem network having a plurality of entities, entity feature attributes, and transactions between entities, comprising:
a data layer capturing data on said plurality of entities, transactions between entities and entity features; and
an analytical layer comprising:
a fraud suspicion score module computing entity fraud suspicion scores for each of plurality of entities;
a path finding module finding non-intersecting paths among all entities in said ecosystem;
a collusion risk score module computing collusion risk scores for each of found path; and
a collusion identification module for identifying collusion partners based on sorting said collusion risk scores among all said found non-intersecting paths.

12. The system of claim 11, wherein said plurality of entities in said ecosystem network comprising of clinics, appraisers and therapists.

13. The system of claim 11, wherein said plurality of entities in said ecosystem network comprising of doctors and pharmacists.

14. The system of claim 11, wherein said path finding module uses BFS method.

15. The system of claim 11, wherein said collusion risk score module computes collusion risk score according to the following:

$$D(P_{i,j}) = K(P_{i,j}) \Sigma_{x=1}^{C_{i,j}} d(P_{i,j}(x))$$

where $P_{i,j}$ is a non-intersecting path between entities $V_i$ and $V_j$, $P_{i,j}(x)$ is an entity on the path $P_{i,j}$ identified by index x, $C_{i,j}$ is the cardinality of path $P_{i,j}$, $d(.)$ is the entity fraud suspicion score, and $K(.)$ is a compactness criterion that weights said collusion risk score in favor of less-dispersed ensembles.

16. The system of claim 15, wherein said compactness criterion is based on the following:

$$K(P_{i,j}) = \frac{1}{C_{i,j}} \exp(-\lambda C_{i,j})$$

where $\lambda$ is a cluster weight parameter having non-negative values.

17. The system of claim 15, wherein said ecosystem network is a one-dimensional Markov model network with neighborhood restricted to entities with direct interactions, and wherein said fraud suspicion score module computes fraud suspicion score according to the following:

$$d(V_i) = \frac{1}{2}\left(\frac{N_{i-1}S_i + N_i S_{i-1}}{N_{i-1} + N_i} + \frac{N_{i+1}S_i + N_i S_{i+1}}{N_i + N_{i+1}}\right)$$

where $N_i$ is the number of transactions handled by entity $V_i$ and $S_i$ is a fraud propensity score for entity $V_i$.

18. The system of claim 15, wherein said ecosystem network is two-dimensional Markov model network with neighborhood restricted to entities with direct interactions, and wherein said entity fraud suspicion score module computes fraud suspicion score according to the following:

$$d(V_0) = \frac{S_0 + \sum_{i=1}^{m} \alpha_i S_i}{1 + \sum_{i=1}^{m} \alpha_i}$$

wherein entity $V_0$ has fraud propensity score $S_0$; m directly linked neighbors $[V_1, \ldots, V_m]$, each of which records $[N_1, \ldots, N_m]$ transactions respectively and has fraud propensities calculated as $[S_1, \ldots, S_m]$; the interactions between $V_0$ and $V_i$ are listed as $N_{0,i}$ for $i=1, \ldots, m$; and the weight parameters $$\alpha_i = \frac{N_{0,i}}{N_i}.$$

19. A non-transitory storage media containing instructions for identifying collusion partners for use in assessing collusion risks involving two or more entities in an ecosystem network, wherein said ecosystem network having a plurality of entities, entity feature attributes, and transactions between entities, said non-transitory storage media comprising:
instructions for calculating an entity suspicion score for each of said plurality of entities based on each entity's feature attributes and on its relationships with other entities in its neighborhood in said ecosystem network;
instructions for finding all possible entity pairs from said plurality of entities, therein each pair having a first entity and a second entity;
instructions for searching all non-intersecting paths between said first entity and said second entity of each found pair of entities;
instructions for calculating a collusion risk score for each of said non-intersecting paths, wherein said collusion risk score is directly proportional to the sum of the entity suspicion scores of every entity in said each path and to compactness of said each path;
instructions for sorting collusion risk scores of all non-intersecting paths for said all possible entity pairs; and instructions for identifying collusion partners from entity pairs having top collusion risk scores.

20. The non-transitory storage media of claim 19, wherein said ecosystem network is one-dimensional Markov model with neighborhood restricted to entities with direct interactions, and wherein said instruction for calculating entity fraud suspicion score is based on the following:

$$d(V_i) = \frac{1}{2}\left(\frac{N_{i-1}S_i + N_i S_{i-1}}{N_{i-1} + N_i} + \frac{N_{i+1}S_i + N_i S_{i+1}}{N_i + N_{i+1}}\right)$$

where $N_i$ is the number of transactions handled by entity $V_i$ and $S_i$ is a fraud propensity score for entity $V_i$.

* * * * *